May 10, 1960 G. R. G. GATES 2,936,033
CLUTCH-OPERATED STEERING GEAR FOR VEHICLES
Filed March 6, 1958

Inventor
Geoffrey Robert Greenbergh Gates
by Stevens, Davis, Miller-Mosher
his attorneys

United States Patent Office 2,936,033
Patented May 10, 1960

2,936,033

CLUTCH-OPERATED STEERING GEAR FOR VEHICLES

Geoffrey Robert Greenbergh Gates, Leamington Spa, England

Application March 6, 1958, Serial No. 719,652

Claims priority, application Great Britain March 9, 1957

5 Claims. (Cl. 180—6.2)

This invention relates to clutch-operated vehicle steering mechanism of the kind in which road wheels on opposite sides of a vehicle are driven through a main shaft the centre portion of which receives the drive from the vehicle engine, the end portions, which are connected to the road wheels, being coupled to the centre portion by driving friction clutches, and a divided steering shaft is provided, the parts of which carry two elements of a differential mechanism having its third element adapted for coupling through speed reduction gearing and a steering friction clutch to the centre portion of the main shaft, each end of the steering shaft being directly connected to a road wheel or road wheels on one side of the vehicle so that, by disengaging one of the friction clutches on the main shaft and engaging the friction clutch associated with the differential mechanism, the road wheels on the two sides of the vehicle are constrained to rotate at different speeds for steering purposes. Vehicle steering mechanism of this kind is described in my U.S. Patent No. 2,746,319, and the object of the present invention is to provide a simplified mechanism having all the advantages of the mechanisms described in those specifications.

The steering mechanism according to the invention is particularly suitable for vehicles of the laterally rigid, multi-driven-wheel type in which it has usually been the practice to drive one pair of wheels directly by the transmission, and to connect the other wheels to the directly driven ones by chain-and-sprocket gearing. In the present invention the driving chains are utilized in place of the gearing which has hitherto been found necessary to connect the main and steering shafts to the directly driven wheels. The steering mechanism according to the invention may, however, also be applied to vehicles having a single driven wheel on each side, further support being provided by castoring wheels; or to endless track vehicles. The term "road wheels" used herein is therefore to be read as including sprockets for driving endless tracks.

According to the invention a clutch-operated vehicle steering mechanism of the kind referred to, and in which rotation is transmitted to the driving element of the differential gear on the steering shaft through directly meshing gears rotating with the main shaft and with the driving member of the steering clutch respectively so that said main shaft and steering shaft are rotated simultaneously in opposite directions, is characterised in that rotation is transmitted through gearing from both shafts to the road wheels, the gearing being such that the road wheels rotate in the same direction as one of said shafts and in the opposite direction to the other.

According to one aspect of the present invention, in a clutch-operated vehicle steering mechanism of the kind referred to, rotation is transmitted to the driving element of the differential gear on the steering shaft through directly meshing gears rotating with the main shaft and the driving member of the steering clutch respectively whereby said shafts are rotated simultaneously in opposite directions and the drive is transmitted from the main shaft and steering shaft to the road wheels of the vehicle through chain-and-sprocket gearing including sprocket chains passing in opposite directions around sprocket wheels on the two shafts.

According to another aspect of the invention, in a clutch-operated vehicle steering mechanism of the kind referred to, each part of the steering shaft and the corresponding end portion of the main shaft are coupled together for simultaneous rotation by chain-and-sprocket gearing including a sprocket chain passing in opposite directions around sprocket wheels on said steering shaft part and main shaft end portion respectively, said sprocket chain also engaging a sprocket wheel rotating with a road wheel or road wheels and transmitting the drive to said road wheel or wheels.

According to another aspect of the invention, in a clutch-operated vehicle steering mechanism of the kind referred to a pair of road wheels have each mounted to rotate with them a spur gear element including both internal and external rings of gear teeth, each part of the steering shaft and the corresponding end portion of the main shaft having pinions thereon which mesh respectively with the internal and external gear rings of the road wheel on the same side of the vehicle.

Selectively engageable gears are preferably provided to vary the speed ratio between the centre portion of the main shaft and the driving member of the steering clutch.

Means may also be provided for locking the driving member of the steering clutch against rotation.

The accompanying diagrammatic drawings show two arrangements of steering mechanism according to the invention, which are hereinafter described by way of example. In the drawings.

Figures 1, 2:
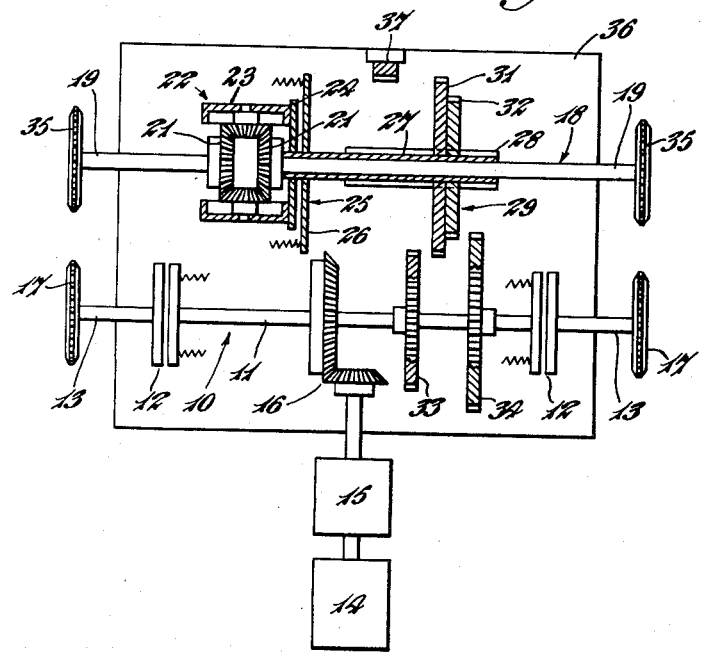
Figure 1 is a plan diagram of one arrangement of the steering mechanism.
Figure 2 is an end view of the mechanism shown in Figure 1.

Referring to Figure 1, a main shaft 10 including a central portion 11 drivingly connected by friction clutches 12, 12 hereinafter called the driving clutches to two independently rotatable end portions 13, 13 has its central portion 11 driven by an engine 14 through a change-speed gear-box 15 and bevel or like gearing 16. Each of the end portions 13, 13 of the shaft 10 has fixed to it a chain sprocket 17. Mounted parallel to the main shaft 10 is a steering shaft 18 divided into two parts 19, 19 each of which has fixed to it one of two elements 21, 21 of a differential gear mechanism 22, the third element 23 of the differential mechanism being fixed to the driven member 24 of a friction clutch 25 hereinafter called the steering clutch. The driving member 26 of the steering clutch 25 is fixed to a sleeve 27 rotatable on one part of the steering shaft 18 and splined at 28 to receive a slidable gear cluster 29 comprising a larger gear wheel 31 and a smaller gear wheel 32. Fixed to the central portion 11 of the main shaft 10 are two axially spaced gear wheels 33 and 34 adapted to mesh respectively with the gear wheels 31 and 32. Each part of the steering shaft 18 carries a sprocket wheel 35 lying in the same plane as one of the sprocket wheels 17 on the main shaft 10. The shafts 10 and 18 are mounted in a housing 36 from which their ends carrying the sprocket wheels project, and an internal gear segment 37 fixed to the housing is adapted to be engaged by the gear wheel 31 when the gear cluster is moved to a suitable position, thus locking the sleeve 27 against rotation.

As will be seen from Figure 2, the sprockets 17 and 35 on one side of the vehicle are engaged by a chain 38 which also passes around a jockey sprocket 39 and two sprockets 41 and 42 fixed to road wheels 43 and 44 respectively, the chain 38 passing in opposite directions around the sprockets 17 and 35. The jockey sprocket 39, which is movably mounted to enable the chain tension to be adjusted, is so positioned as to ensure that the chain 38 is in engagement with the sprocket 35 around a substantial proportion of the periphery of the latter. A similar arrangement is, of course, provided on the other side of the vehicle.

If only one driven road wheel is provided on each side of the vehicle, the chain 38 may be led directly from the sprocket 41 to the jockey sprocket 39, or the sprocket gearing may be replaced by toothed gearing as shown in Figure 3.

Suitable selector mechanism is provided for disengaging the driving clutches 12 which are normally engaged, each being disengageable independently of the other, and for engaging the steering clutch 25, which is normally disengaged, simultaneously with the disengagement of either driving clutch 12.

Further selector mechanism is provided to move the gear cluster 29 and engage either the gear 31 with the gear 33 or the gear 32 with the gear 34 or, with both pairs of gears out of mesh, to engage the gear 31 with the locking segment 37.

For driving the vehicle in a straight path, the driving clutches 12, 12 are both engaged and the steering clutch 25 is disengaged. The two sprockets 17, 17 are therefore driven at equal speeds, whilst the sprockets 35, 35 are free to rotate idly, the differential mechanism 22 rotating as a whole. The road wheels are therefore driven at equal speeds.

If now one of the driving clutches 12, for example that on the left in Figure 1, is released and the steering clutch 25 is wholly or partially engaged, the driving power applied by the left-hand sprocket 17 to the chain 38 which engages it is removed. Assuming that one pair of gears 31, 33 or 32, 34 is in mesh, rotation is transmitted through the steering clutch 25 to the member 23 of the differential mechanism which member turns in the opposite direction to the main shaft 10. The right-hand sprocket 35 is constrained, by the chain 38 on the right-hand side of the vehicle to rotate at the same speed as the right-hand sprocket 17 having the same direction of rotation as the member 23 of the differential mechanism but a greater speed. Thus the sprocket 35 on the left-hand side is rotated at a lower speed than the sprocket 35 at the right-hand side and power is abstracted from the left-hand chain 38. Consequently, the wheels on the left-hand side of the vehicle are constrained to rotate at a slower speed than the wheels on the right-hand side, and the vehicle turns to the left. The sharpness of the turn depends on the degree to which the steering clutch 25 is engaged; increasing sharpness of turn being produced by reducing the slip in that clutch.

Depending on whether the gears 31, 33 or the gears 32, 34 are in engagement, the minimum available turn radius is different, the smaller radius being provided by engaging the gears 31, 33. These latter gears are therefore usually engaged for slow-speed manoeuvering, whilst the gears 32, 34 are engaged for higher speed operation.

If the gear 31 is engaged with the segment 37, the vehicle can be caused to pivot about its own centre by releasing one driving clutch 12 and engaging the steering clutch 25. The member 23 of the differential mechanism is thus held against rotation, so that the drive transmitted through the engaged driving clutch 12 to one set of sprocket wheels 17, 35 is transferred through the differential gear 22 to the other sprocket wheel 35 to produce equal motion thereof in the opposite direction.

I claim:

1. In a vehicle having road wheels on both sides thereof and an engine for driving said road wheels, a clutch-operated steering mechanism comprising a main shaft having a center portion driven by said engine and two end portions, two normally engaged main clutches connecting the center portion of the main shaft with the end portions, respectively, a differential gear unit having first, second and third elements, a steering shaft divided into two portions, said first and second elements of the differential gear unit being mounted each on one of said steering shaft portions, a normally disengaged steering clutch comprising a driving member and a driven member, said driven member being connected to the third element of the differential gear unit, a speed reduction gearing coupling the driving member of said steering clutch to the center portion of the main shaft, sprocket wheels mounted on said main shaft end portions, sprocket wheels mounted on said steering shaft portions, a sprocket wheel mounted to rotate with at least one road wheel on each side of the vehicle, and sprocket chains one on each side of the vehicle passing around the sprocket wheels on that side of the vehicle on the steering shaft portion and main shaft end portion in opposite directions and also passing around the sprocket wheel mounted to rotate with the road wheel on that side of the vehicle.

2. The combination as claimed in claim 1 wherein the speed reduction gearing includes a plurality of pairs of gear wheels providing different drive ratios.

3. The combination as claimed in claim 1, wherein locking means are provided to prevent rotation of the driving member of the steering clutch.

4. The combination according to claim 1, wherein the speed reduction gearing includes a plurality of gear wheels fixed to the center portion of the main shaft, complementary gear wheels constituting a sliding cluster, a sleeve fast with the driving member of the steering clutch, mutually engaging splines on said sliding cluster and sleeve, and a fixed gear segment, one of said gear wheels constituting said sliding cluster being movable into engagement with said fixed gear segment to prevent rotation of the driving member of the steering clutch.

5. The combination according to claim 1, wherein a jockey sprocket is provided on each side of the vehicle, each of the sprocket chains engaging one of said jockey sprockets.

References Cited in the file of this patent

UNITED STATES PATENTS

| | | |
|---|---|---|
| 2,746,319 | Gates | May 22, 1956 |
| 2,749,774 | Gates | June 12, 1956 |